(12) United States Patent
Aoyama et al.

(10) Patent No.: US 12,129,357 B2
(45) Date of Patent: Oct. 29, 2024

(54) COMPOSITION AND METHOD FOR PRODUCING CELLULOSE FIBER

(71) Applicant: MITSUBISHI GAS CHEMICAL COMPANY, INC., Tokyo (JP)

(72) Inventors: Kimihiro Aoyama, Tokyo (JP); Tetsuhiko Mizusaka, Tokyo (JP); Yasuyoshi Nakayasu, Tokyo (JP); Yasuo Gotoh, Nagano (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 199 days.

(21) Appl. No.: 17/605,336

(22) PCT Filed: Apr. 21, 2020

(86) PCT No.: PCT/JP2020/017162
§ 371 (c)(1),
(2) Date: Oct. 21, 2021

(87) PCT Pub. No.: WO2020/218280
PCT Pub. Date: Oct. 29, 2020

(65) Prior Publication Data
US 2022/0243035 A1    Aug. 4, 2022

(30) Foreign Application Priority Data
Apr. 23, 2019 (JP) .................. 2019-082016

(51) Int. Cl.
*C08L 1/02* (2006.01)
*C08K 5/3445* (2006.01)
*D01D 5/06* (2006.01)

(52) U.S. Cl.
CPC .............. *C08K 5/3445* (2013.01); *C08L 1/02* (2013.01); *D01D 5/06* (2013.01); *D10B 2201/20* (2013.01)

(58) Field of Classification Search
USPC .......................................................... 162/72
See application file for complete search history.

(56) References Cited

U.S. PATENT DOCUMENTS

| 10,260,171 B1 | 4/2019 | Kaukler |
| 2008/0269477 A1 | 10/2008 | Stegmann et al. |

(Continued)

FOREIGN PATENT DOCUMENTS

| CN | 1844214 A | 10/2006 |
| CN | 1977072 A | 6/2007 |

(Continued)

OTHER PUBLICATIONS

Extended European Search Report issued in European Patent Application No. 20794339.0 dated May 23, 2022.

(Continued)

*Primary Examiner* — Jacob T Minskey
(74) *Attorney, Agent, or Firm* — GREENBLUM & BERNSTEIN, P.L.C.

(57) ABSTRACT

Provided is a cellulose solution (a composition) in which decomposition of cellulose does not easily proceed even if heated. Further, provided is a method for producing a cellulose fiber excellent in mechanical strength. The composition includes cellulose and a compound represented by the following formula (1), a concentration of 1-methylimidazolium chloride being 300 ppm or less on a mass basis with respect to the compound represented by the formula (1).

In the formula (1), R is an alkyl group having 2 to 6 carbon atoms, and Me is a methyl group.

(Continued)

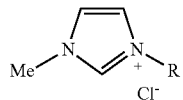

(1)

20 Claims, 1 Drawing Sheet

(56) References Cited

U.S. PATENT DOCUMENTS

| | | | |
|---|---|---|---|
| 2010/0256352 A1 | 10/2010 | Uerdingen et al. | |
| 2012/0129227 A1* | 5/2012 | Sapra .................. | C12N 9/2437 435/252.33 |
| 2012/0328877 A1 | 12/2012 | Shiramizu et al. | |
| 2016/0108137 A1 | 4/2016 | Buchanan et al. | |
| 2016/0168757 A1 | 6/2016 | Sugimoto et al. | |
| 2017/0209346 A1 | 7/2017 | Krieg et al. | |
| 2019/0031858 A1 | 1/2019 | Kozawa et al. | |
| 2019/0081347 A1 | 3/2019 | Mohtadi et al. | |
| 2020/0274188 A1 | 8/2020 | Mohtadi et al. | |

FOREIGN PATENT DOCUMENTS

| | | |
|---|---|---|
| CN | 101219840 A | 7/2008 |
| CN | 101346416 A | 1/2009 |
| CN | 102791911 A | 11/2012 |
| CN | 104471121 A | 3/2015 |
| CN | 104520477 A | 4/2015 |
| CN | 105229209 A | 1/2016 |
| CN | 105801884 A | 7/2016 |
| CN | 105829605 A | 8/2016 |
| CN | 107001699 A | 8/2017 |
| CN | 108884328 A | 11/2018 |
| EP | 3 000 919 A1 | 3/2016 |
| JP | 2008-266625 A | 11/2008 |
| JP | 2009-114437 A | 5/2009 |
| JP | 2009-520846 A | 5/2009 |
| JP | 2009-227638 A | 10/2009 |
| JP | 2010-104768 A | 5/2010 |
| JP | 2011-505435 A | 2/2011 |
| JP | 2011-074113 A | 4/2011 |
| JP | 2017-514025 A | 6/2017 |
| JP | 2019-53979 A | 4/2019 |
| WO | 2006/000197 A1 | 1/2006 |
| WO | 2007/076979 A1 | 7/2007 |
| WO | 2015/053226 A1 | 4/2015 |
| WO | 2015/092146 A1 | 6/2015 |
| WO | 2016/071573 A1 | 5/2016 |
| WO | 2017/170745 A1 | 10/2017 |

OTHER PUBLICATIONS

Dorn, S., et al., Macromolecular Materials and Engineering, Wiley Vch Verlag, Weinheim, DE, vol. 293, Jan. 1, 2008, pp. 907-913.
International Search Report issued in International Patent Application No. PCT/JP2020/017162, dated Jul. 14, 2020, along with an English translation thereof.
International Preliminary Report on Patentability issued in International Patent Application No. PCT/JP2020/017162, dated Jul. 14, 2020, along with an English translation thereof.
Office Action issued in the corresponding Japanese Patent Application No. 2021-516125 dated Sep. 27, 2022, along with English translation thereof.
Office Action issued in the corresponding Chinese Patent Application No. 202080029989.2 dated Nov. 15, 2022, along with English translation thereof.
Green Chemistry, No. 3. 20160430, pp. 111; attention is directed to item 2 above, p. 5 of translation for statement regarding this document.
Office Action issued in Taiwanese Patent Application No. 109112943, Nov. 20, 2023 (with X/Y/A chart).
Office Action issued in JP Patent Application No. 2023-108650, Jul. 2, 2024, translation.

* cited by examiner

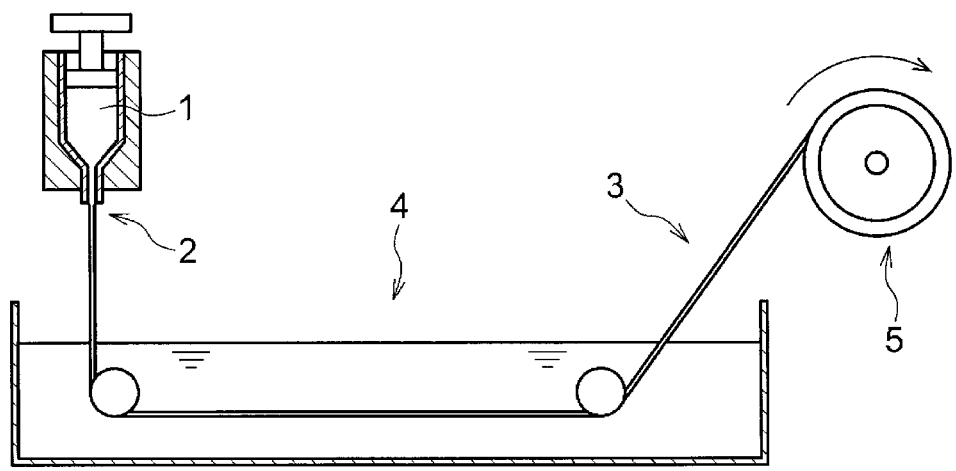

COMPOSITION AND METHOD FOR PRODUCING CELLULOSE FIBER

TECHNICAL FIELD

The present invention relates to a composition, and to a method for producing a cellulose fiber.

Particularly, it relates to a composition etc. for producing a cellulose fiber used for fiber reinforced resin materials such as FRP (Fiber Reinforced Plastics).

BACKGROUND ART

Fiber composite materials containing high strength and high modulus fibers such as glass fibers to enhance strength and stiffness of plastics have been used in a variety of fields of automobile parts, sporting goods, building materials, miscellaneous good, etc.

A glass fiber reinforced resin material, which has used as a light weight high strength material, demonstrates excellent characteristics in use. However, when the glass fiber is used as a reinforcing fiber, residues are caused during disposal, thereby occurring a problem of a large burden on the environment.

Further, also on a printed wiring board, to improve insulation properties and stiffness, the glass fiber is used as a base material. Even here, however, when the glass fiber is used, residues are caused during disposal, thereby occurring a problem of a large burden on the environment.

Then, as the reinforcing fiber for the fiber reinforced resin materials and as the base material for the printed wiring board, considered has been a use of a cellulose fiber having excellent characteristics of high mechanical properties, dimension stability, a low thermal expansion, electrical insulation properties, a low specific gravity, etc.

For example, in Patent Literature 1, disclosed is a method for spinning a high strength and high modulus continuous cellulose fiber having a tensile modulus of 35 GPa or more, the method comprising: dissolving a cellulose raw material in an ionic liquid to have an average polymerization degree of 3000 or less; and spinning the cellulose fiber to have an average fiber diameter of 30 μm or less. Further, in the same Literature, as the ionic liquid composed of an imidazolium compound, described are 1-ethyl-3-methylimidazolium acetate, 1-butyl-3-methylimidazolium chloride, 1-ethyl-3-methylimidazolium diethyl-phosphate, 1-butyl-3-methyl-imidazolium acetate, 1,3-dimethylimidazolium acetate, 1-ethyl-3-methylimidazolium propionate, and 1-allyl-3-methylimidazolium chloride.

CITATION LIST

Patent Literature

[Patent Literature 1] International Publication No. WO 2015/053226

SUMMARY OF INVENTION

Technical Problem

As a result of studies by the present inventor, it has been found that when cellulose is dissolved in a solvent containing an ionic liquid in order to produce a cellulose fiber, the dissolved cellulose may be decomposed. Particularly, it has been found that the decomposition of the cellulose easily proceeds when heated. Further, when the cellulose is decomposed to reduce the molecular weight, strength of the fiber to be obtained is reduced.

An objective of the present invention is to solve such a problem, i.e., to provide a composition which the decomposition of the cellulose does not easily proceed even if heated. Further, it is another objective to obtain a cellulose fiber excellent in mechanical strength.

Solution to Problem

Under the above-mentioned problem, as a result of studies by the present inventor, in case that 1-butyl-3-methylimidazolium chloride was used as a solvent dissolving the cellulose, it was found that when there was a lot of 1-methylimidazolium chloride (hereinafter, may be referred to as "MIC") which was an impurity unavoidably contained in the 1-butyl-3-methylimidazolium chloride (solvent), the decomposition of the cellulose easily progressed. In this way, the present invention has been completed. Specifically, the above-mentioned problem has been solved by the following means.

<1> A composition comprising cellulose and a compound represented by the following formula (1), a concentration of 1-methylimidazolium chloride being 300 ppm or less on a mass basis with respect to the compound represented by the formula (1):

[Formula 1]

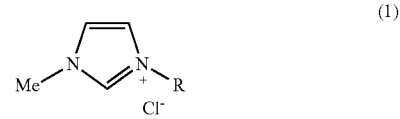

wherein, R is an alkyl group having 2 to 6 carbon atoms, and Me is a methyl group, in the formula (1).

<2> The composition according to <1>, wherein a content of the compound represented by the formula (1) in the composition accounts for 90% by mass or more of a solvent contained in the composition.

<3> The composition according to <1> or <2>, wherein a content of the 1-methylimidazolium chloride in the composition is 1 ppb or more with respect to the compound represented by the formula (1).

<4> The composition according to any one of <1> to <3>, wherein R is a butyl group in the formula (1).

<5> A method for producing a cellulose fiber, comprising spinning a composition, the composition comprising cellulose and a compound represented by the following formula (1), a concentration of 1-methylimidazolium chloride being 300 ppm or less on a mass basis with respect to the compound represented by the formula (1):

[Formula 2]

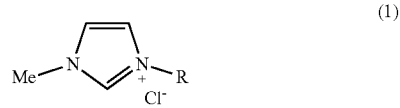

wherein R is an alkyl group having 2 to 6 carbon atoms, and Me is a methyl group, in the formula (1).

<6> The method for producing the cellulose fiber according to <5>, wherein a content of the compound represented by the formula (1) in the composition accounts for 90% by mass or more of a solvent contained in the composition.

<7> The method for producing the cellulose fiber according to <5> or <6>, wherein a content of the 1-methylimidazolium chloride in the composition is 1 ppb or more with respect to the compound represented by the formula (1).

<8> The method for producing the cellulose fiber according to any one of <5> to <7>, wherein R is a butyl group in the formula (1).

<9> The method for producing the cellulose fiber according to any one of <5> to <8>, wherein the compound represented by the formula (1) is obtained by treating a reaction product of 1-methyl imidazole and RCl with a treating agent having ion adsorption ability, and wherein R is an alkyl group having 2 to 6 carbon atoms.

<10> The method for producing the cellulose fiber according to <9>, wherein the treating agent having the ion adsorption ability is at least one selected from the group consisting of an ion exchange resin, activated carbon, zeolite, hydrotalcite, and a metal oxide.

<11> The method for producing the cellulose fiber according to any one of <5> to <8>, wherein the compound represented by the formula (1) is obtained by treating a reaction product of 1-methyl imidazole and RCl with an alkali, wherein R is an alkyl group having 2 to 6 carbon atoms.

<12> The method for producing the cellulose fiber according to <11>, wherein the alkali is at least one selected from the group consisting of sodium hydroxide, potassium hydroxide, lithium hydroxide, calcium hydroxide, magnesium hydroxide, strontium hydroxide, barium hydroxide, tetramethylammonium hydroxide, tetraethylammonium hydroxide, and tetrabutylammonium hydroxide.

<13> The method for producing the cellulose fiber according to any one of <5> to <12>, wherein the method comprises immersing the spun cellulose fiber in a coagulating liquid, to elute the compound represented by the formula (1) contained in the cellulose fiber into the coagulating liquid.

<14> The method for producing the cellulose fiber according to <13>, wherein the method comprises recycling the compound represented by the formula (1) eluted into the coagulating liquid.

<15> The method for producing the cellulose fiber recited in <13> or <14>, wherein the coagulating liquid comprises water.

Advantageous Effects of Invention

According to the present invention, it has become possible to provide the cellulose solution (the composition) in which the decomposition of the cellulose does not easily proceed even if heated. Further, it has become possible to provide the cellulose fiber excellent in mechanical strength.

BRIEF DESCRIPTION OF DRAWING

FIG. 1 is one instance of a schematic drawing showing an equipment and steps for producing a cellulose fiber.

DESCRIPTION OF EMBODIMENTS

Hereinafter, the contents of the present invention will be described in detail. Here, in the present description, "–" is used to mean that numerals recited before and after that symbol are included as a lower limit value and an upper limit value.

In the present description, ppm means ppm by mass.

In the present description, Me indicates a methyl group; and Bu indicates a butyl group.

[Composition]

A composition of the present invention is a composition comprising cellulose and a compound represented by the following formula (1), a concentration of 1-methylimidazolium chloride being 300 ppm or less on a mass basis with respect to the compound represented by the formula (1):

[Formula 3]

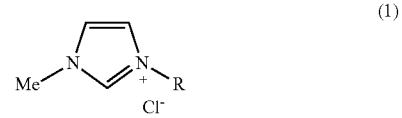

wherein R is an alkyl group having 2 to 6 carbon atoms, and Me is a methyl group, in the formula (1).

In this manner, by setting the concentration of the MIC at 300 ppm or less with respect to the compound represented by the formula (1), it is possible to effectively suppress the decomposition of the cellulose in the composition.

With respect to the compound represented by the formula (1), particularly the 1-butyl-3-methylimidazolium chloride, during its production, the MIC is produced as a byproduct. And then, it is speculated that the cellulose becomes to be decomposed easily when a content of the MIC becomes large amounts.

Here, it is considered that the MIC becomes in equilibrium with 1-methyl imidazole and hydrochloric acid, to generate hydrochloric acid. In the present invention, it is speculated that a generated amount of the hydrochloric acid unavoidably contained in the compound represented by the formula (1) can be suppressed by setting the concentration of the MIC at 300 ppm or less on a mass basis with respect to the compound represented by the formula (1).

Hereinafter, the present invention will be described in detail.

<Composition>

The composition of the present invention comprises the cellulose and the compound represented by the formula (1). Further, the concentration of the MIC is 300 ppm or less on a mass basis with respect to the compound represented by the formula (1).

Hereinafter, these are described in detail.

<<Cellulose>>

The cellulose is not particularly specified, and examples may include natural cellulose raw materials such as wood pulp, cotton, cotton linters, hemp, bamboo and abaca, regenerated cellulose fibers such as rayon, cupra and lyocell, and regenerated cellulose such as papers and clothes composed of those materials.

As one embodiment of the present invention, it is pointed out that the cellulose is the regenerated cellulose.

A content of the cellulose (a concentration of the cellulose) in the composition of the present invention is preferably 1% by mass or more, more preferably 3% by mass or more, even more preferably 5% by mass or more, still more preferably 7% by mass or more. Setting it at the above lower limit or more provides the composition with a viscosity easy to induce a molecular orientation during spinning, thereby tending to form a fiber having excellent mechanical strength. Further, the content of the cellulose in the composition of the present invention is preferably 20% by mass or less, more preferably 17% by mass or less, even more preferably 14% by mass or less. Setting it at the above upper limit or less does not provide the composition with too high a viscosity, and therefore can reduce burden on the equipment etc. during the spinning.

Also, only one type of the cellulose may be used, or two or more types of the cellulose may be used. In case that two or more types of the cellulose is used, it is preferable that the total amount of them is in the above range.

<<Compound Represented by Formula (1)>>

The composition of the present invention comprises the compound represented by the formula (1). The compound represented by the formula (1) usually functions as a solvent for dissolving the cellulose. Further, the compound represented by the formula (1) is usually an ionic liquid.

[Formula 4]

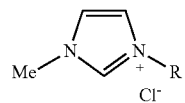

(1)

wherein R is an alkyl group having 2 to 6 carbon atoms, and Me is a methyl group, in the formula (1).

In the formula (1), R is preferably the alkyl group having 2-5 carbon atoms, more preferably the alkyl group having 2 to 4 carbon atoms, even more preferably the alkyl group having 2 or 4 carbon atoms, still more preferably the butyl group. The alkyl group is preferably a linear or branched alkyl group, and more preferably the linear alkyl group. The butyl group may be any one of t-butyl group, n-butyl group, sec-butyl group, and iso-butyl group, but preferably n-butyl group.

A content of the compound represented by the formula (1) in the composition of the present invention is preferably 80% by mass or more, more preferably 83% by mass or more, even more preferably 86% by mass or more. Further, the content of the compound represented by the formula (1) in the composition of the present invention is preferably 99% by mass or less, more preferably 97% by mass or less, even more preferably 95% by mass or less, still more preferably 93% by mass or less. Setting it in such a range provides the composition with a viscosity easy to induce a molecular orientation during spinning, thereby tending to form a fiber having more excellent mechanical strength.

Furthermore, the compound represented by the formula (1) accounts for preferably 90% by mass or more of the solvent contained in the composition, more preferably 95% by mass or more, even more preferably 98% by mass or more, still more preferably 99% by mass or more. Setting it in such a range does not provide the composition with too high a viscosity, and therefore can reduce burden on the equipment etc. during the spinning.

With respect to the compound represented by the formula (1), only one type, or two or more types may be used. In case of using two or more types, it is preferable that the total amount of them is in the above range.

In the present invention, a method for obtaining the compound represented by the formula (1) is not particularly limited, but can utilize a known technology.

The compound represented by the formula (1) can be obtained from, e.g., a reaction product of 1-methyl imidazole and RCl, wherein R is an alkyl group having 2 to 6 carbon atoms. Specifically, the compound represented by the formula (1) can be obtained by treating a reaction product of 1-methyl imidazole and RCl with a treating agent having ion adsorption ability, wherein R is an alkyl group having 2 to 6 carbon atoms. R is synonymous with R in the formula (1), and the preferred range is also the same.

The treating agent having the ion adsorption ability is preferably at least one selected from the group consisting of an ion exchange resin, activated carbon, zeolite, hydrotalcite, and a metal oxide, more preferably the ion exchange resin and the hydrotalcite, even more preferably the ion exchange resin. Examples of the metal oxides include magnesium oxide, calcium oxide, strontium oxide, barium oxide, aluminum oxide, zirconium oxide, titanium oxide and silicon oxide.

Further, the compound represented by the formula (1) is obtained by treating a reaction product of 1-methyl imidazole and RCl with an alkali, wherein R is an alkyl group having 2 to 6 carbon atoms. R is synonymous with R in the formula (1), and the preferred range is also the same.

The alkali is preferably at least one selected from the group consisting of sodium hydroxide, potassium hydroxide, lithium hydroxide, calcium hydroxide, magnesium hydroxide, strontium hydroxide, barium hydroxide, tetramethylammonium hydroxide, tetraethylammonium hydroxide, and tetrabutylammonium hydroxide, more preferably sodium hydroxide, tetramethylammonium hydroxide and tetraethylammonium hydroxide, even more preferably sodium hydroxide.

<<1-Methylimidazolium Chloride (MIC)>>

A concentration of the MIC in the composition of the present invention is 300 ppm or less on a mass basis with respect to the compound represented by the formula (1). With such a composition, it is possible to effectively suppress reduction of the molecular weight due to the decomposition of cellulose in the composition.

The concentration of the MIC in the composition of the present invention is preferably 250 ppm or less on a mass basis with respect to the compound represented by the formula (1), more preferably 200 ppm or less, even more preferably 150 ppm or less, still more preferably 120 ppm or less, still more preferably 90 ppm or less, still more preferably 50 ppm or less, still more preferably 40 ppm or less, and may be 25 ppm or less. Setting it at the shove upper limit or less can effectively suppress reduction of the molecular weight due to the decomposition of cellulose in the composition.

Further, a content of the MIC in the composition of the present invention may be 0 with respect to the compound represented by the formula (1), but preferably 1 ppb or more. Setting it to 1 ppb or more slightly drops the viscosity of the cellulose, and therefore can increase the yield when the composition is discharged from a nozzle. Furthermore, the content of MIC in the composition of the present invention may be 5 ppm or more, and further may be 10 ppm or more, with respect to the compound represented by the formula (1).

<Other Components>

The composition of the present invention may contain other solvents (usually ionic liquids) than the compound represented by the formula (1) and the MIC. Examples of other solvents mentioned above include imidazolium compounds other than the above compounds, and examples thereof include 1-ethyl-3-methylimidazolium acetate, 1-ethyl-3-methylimidazolium diethyl-phosphate, 1-butyl-3-methylimidazolium acetate, 1-butyl-3-methylimidazolium propionate, 1-butyl-3-methylimidazolium formate, 1-butyl-3-methylimidazolium bromide, 1-butyl-3-methylimidazolium dimethyl phosphate, 1,3-dimethylimidazolium acetate, 1-ethyl-3-methylimidazolium propionate, 1-ethyl-3-methylimidazolium formate, 1-ethyl-3-methylimidazolium bromide, 1-ethyl-3-methylimidazolium dimethyl phosphate, 1-aryl-3-methylimidazolium chloride, etc.

Further, the composition of the present invention may contain an aprotic polar solvent and/or a stabilizer in addition to the above solvents. Examples of the aprotic solvent include dimethyl sulfoxide, pyridine, N,N-dimethylacetamide, N,N-dimethylformamide, N-methyl-2-pyrolidone, etc. Examples of the stabilizer include pyrocatechine, pyrogallol, gallic acid, methyl ester gallate, ethyl ester gallate, propyl ester gallate, isopropyl ester gallate, ellagic acid, oxalic acid, phosphoric acid, sodium hexametaphosphate, tannin, tannic acid, etc.

In the composition of the present invention, the total amount of the cellulose, and the compound represented by the formula (1), as well as the MIC and other components as optional components, is 100% by mass. In the composition of the present invention, the cellulose and the compound represented by the formula (1) accounts for preferably 98% by mass or more in total, and more preferably 99% by mass or more. Setting it at the above lower limit or more does not hinder dissolution of the cellulose and provides the composition with a viscosity easy to induce a molecular orientation during spinning, thereby tending to form fibers having more excellent mechanical strength.

<Physical Properties of Composition>

With respect to the composition of the present invention, a shear viscosity under the conditions of 100° C. and a shear rate of 0.1 ($s^{-1}$) is preferably 1000 Pa·s (Pascal·second) or more, more preferably 1500 Pa·s or more, even more preferably 2000 Pa·s or more, still more preferably 2500 Pa·s or more, still more preferably 2800 Pa·s or more. When it is 1000 Pa·s or more, particularly 2000 Pa·s or more, a molecular weight of the cellulose molecular in the composition becomes relatively high value, thereby obtaining the cellulose fiber having higher strength. Further, with respect to the composition of the present invention, the shear viscosity under the conditions of 100° C. and a shear rate of 0.1 ($s^{-1}$) is preferably 4500 Pa·s or less, more preferably 4000 Pa·s or less, even more preferably 3800 Pa·s or less, still more preferably 3500 Pa·s or less. Setting it at 4500 Pa·s or less can improve discharge characteristics of the composition from the nozzle.

In one case where a standby time is considered for which the composition of the present invention is held in a heated state in the tank until the composition is discharged from the nozzle, it is held at 100° C. for 5 hours, and the subsequent shear viscosity under the conditions of 100° C. and a shear rate of 0.1 ($s^{-1}$) is preferably 1500 Pa·s or more, more preferably 1800 Pa·s or more, even more preferably 2000 Pa·s or more, still more preferably 2200 Pa·s or more. What the viscosity is 1500 Pa·s or more means that the decomposition of the cellulose molecular does not relatively proceed, so that the higher strength cellulose fiber can be obtained. Further, with respect to the composition of the present invention, the shear viscosity under the condition of 100° C. and a shear rate of 0.1 ($s^{-1}$), is preferably 4000 Pa·s or less, more preferably 3500 Pa·s or less, even more preferably 3200 Pa·s or less. Setting it to 4000 Pa·s or less can improve discharge characteristics of the composition from the nozzle.

In the composition of the present invention, a shear viscosity retention ratio: (the shear viscosity of the composition after the heat treatment of at 100° C. for 5 hours/the shear viscosity of the composition before the heat treatment) times 100 (unit: %) is preferably 40% or more, more preferably 50% or more, even more preferably 55% or more.

<Preparation Method of Composition>

In the present invention, it is preferable that the composition is prepared by mixing the cellulose, the solvent (the compound represented by the formula (1) and the MIC), and further other components optionally added. Depending on the average polymerization degree of the cellulose, it is preferable to adjust a dissolving time and a dissolving temperature, and to dissolve the cellulose until it becomes to be a homogeneous solution (a cellulose solution).

When the cellulose is dissolved in the solvent, it is preferable to heat it. For heating, general heating means may be used such as heating in an oven, heating in a water bath or an oil bath, and heating by microwave. Further, for heating, to accelerate dissolution of the cellulose raw material, it is preferable that stirring is performed. A stirring means is also optional, and from known stirring methods represented by mechanical stirring using a stirring bar and an impeller, stirring using shaking a container, stirring using ultrasonic irradiation, etc., an appropriate means may be adopted depending on the scale etc. The heating temperature is preferably 70° C. or more, more preferably 80° C. or more. The upper limit of the heating temperature is preferably 130° C. or less, more preferably 120° C. or less.

Furthermore, at a time of heating and dissolving, to suppress oxidation and decomposition of the cellulose, it is preferable that it is dissolved under an atmosphere of an inert gas such as nitrogen.

The composition obtained by dissolving the cellulose raw material in the solvent may be used in a later step as it is, but in case that an undissolved content and an insoluble content are remained in the solution, these may be filtered before use.

[Method for Producing Cellulose Fiber]

The method for producing the cellulose fiber of the present invention comprises spinning a composition, the composition comprising cellulose and a compound represented by the following formula (1), a concentration of MIC being 300 ppm or less on a mass basis with respect to the compound represented by the formula (1):

[Formula 5]

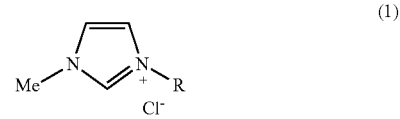

(1)

wherein R is an alkyl group having 2 to 6 carbon atoms, and Me is a methyl group, in the formula (1).

With such composition, it is possible to obtain the cellulose fiber excellent in mechanical strength.

The method for producing the cellulose fiber of the present invention preferably comprises immersing the spun cellulose fiber in a coagulating liquid to elute the compound represented by the formula (1) contained in the cellulose fiber into the coagulating liquid.

Furthermore, the method for producing the cellulose fiber of the present invention may comprise recycling the compound represented by the formula (1) eluted into the coagulating liquid.

Hereinafter, the method for producing the cellulose fiber of the present invention will be explained in accordance with FIG. 1. It is needless to say that the method of the present invention should not be limited to these.

FIG. 1 is one instance of a schematic drawing showing an equipment and steps for producing a cellulose fiber, each of numeral numbers 1, 2, 3, 4 and 5 respectively denoting a composition (a cellulose solution), a nozzle, a cellulose fiber, a coagulating liquid, and a winding machine.

In the present invention, the composition 1 is discharged from the nozzle 2. The composition 1 of the present invention tends to have a high viscosity and a poor fluidity when it is discharged from the nozzle. Thus, to improve the fluidity, it is preferable to heat and then discharge the composition. The temperature of the composition at the time of discharge is preferably 70° C. or more, more preferably 80° C. or more. Setting it at 70° C. or more tends to more improve the fluidity of the composition. Further, the upper limit of the temperature of the composition at the time of discharge is preferably 130° C. or less, more preferably 120° C. or less. Setting it at 130° C. or less can suppress the decomposition of cellulose more effectively.

Further, at the time of discharge, a diameter of the nozzle can be set to e.g., 0.1-0.5 mm. The composition is synonymous with the composition described above, and the preferred range is also the same.

The fibrous composition discharged from the nozzle 2 is immersed in the coagulating liquid 4. By immersing it in the coagulating liquid, the fibrous composition is spun. As the coagulating liquid, there can be used water in a temperature range of 0° C. or more and 100° C. or less, or a lower alcohol, a polar solvent, a nonpolar solvent or the like in a temperature range of −40° C. or more and 100° C. or less. In consideration of economic efficiency and a work environmental aspect, a solvent containing water is preferable. Since the solvent containing the compound represented by the formula (1) in the composition 1 is eluted into the coagulating liquid, the coagulating liquid during production when cellulose fibers are continuously produced also contains the solvent including the compound represented by the formula (1), in addition to the original coagulating liquid described above. Also, the lower alcohol means alcohol having carbon atoms of 1 or more and 5 or less.

Further, after the composition is immersed in the coagulating liquid, washing may be performed. The washing is preferably performed by using a liquid containing water.

During immersing in the coagulating liquid, or by means of subsequent washing, the solvent is eliminated from the composition spun, to obtain the cellulose fiber. It is preferable that the amount of the solvent in the cellulose fiber is 10000 ppm or less, if converted from the amount of nitrogen detected by the element analysis of the cellulose fibers obtained to the amount of the solvent.

The solvent dissolved in the coagulation liquid described above (particularly the compound represented by the formula (1) which is the ionic liquid) is collected, and again, may be recycled to the production of the cellulose fibers. Since the composition of the present invention has less amount of impurity (MIC) in the solvent, the recycle can be conducted more effectively. When recycling, the coagulating liquid containing the solvent can separate the solvent (particularly the compound represented by the formula (1) which is an ionic liquid) by fractional distillation.

The cellulose fiber free of the solvent described above is winded by the winding machine 5 thereafter. By adjusting winding speed of the winding machine, the cellulose fiber obtained is stretched to be able to adjust a fiber diameter of the cellulose fiber. Besides the winding machine, a stretching roll etc. may be provided for stretching.

Further, a stretching ratio of the cellulose fiber is preferably 1-30, more preferably 3-20.

When the cellulose fiber is stretched by adjusting the winding speed with respect to the discharge speed of the cellulose fiber from the nozzle, its ratio (the winding speed/the discharge speed) is preferably 10-100, more preferably 30-70.

Further, the tensile strength of the cellulose fiber can be 800 MPa or more, even after the composition passes through the standby time in the heated state in the tank until it is discharged from the nozzle. Even if the fiber is formed by using the composition heated at 100° C. for 5 hours as one case in consideration of the standby time in the heated state in the tank, the composition of the present invention is valuable in that its tensile strength is 800 MPa or more.

Further, a number average fiber diameter of the cellulose fiber obtained is preferably 1-30 μm, more preferably 3-20 μm.

The cellulose fiber formed from the composition of the present invention and the cellulose fiber obtained by the method for producing the cellulose fiber of the present invention are preferably used for the fiber reinforced resin materials of FRP etc.

When producing the fiber reinforced resin materials, it is preferable to mix cellulose fibers and at least one resin selected from the group consisting of a thermoplastic resin and a thermosetting resin. Examples of the thermoplastic resin in the fiber reinforced resin materials include a polyamide resin (nylon), a polyacetal resin, a polycarbonate resin, a polyvinylchloride resin, an ABS resin, a polysulfone resin, a polyethylene resin, a polypropylene resin, a polystyrene resin, a (meth)acrylic resin, and a fluorocarbon resin; and examples of the thermosetting resin include an unsaturated polyester resin, an epoxy resin, a melamine resin, and a phenolic resin. In case that the fiber reinforced resin material contains the thermosetting resin, included in the fiber reinforced resin material are the fiber reinforced resin material in which the thermosetting resin is completely cured, as well as a prepreg in which the thermosetting resin is semi-cured. Further, in the fiber reinforced resin material, if necessary, an additive such as a shrinkage reducing agent, a flame retardant, a flame retardant auxiliary, a plasticizer, an antioxidant, an ultraviolet absorbent, a colorant, a pigment, and a filler may be contained.

EXAMPLES

Hereinafter, the present invention will be described in more specifically with reference to examples. The materials, the amount used, the ratio, the processing details, the processing procedure, etc. shown in the examples below, can be changed as appropriate as long as the gist of the present invention is not deviated. Therefore, the scope of the present invention should not be limited to specific examples shown below.

Example 1

<Preparation of Ionic Liquid (Solvent)>

Sodium hydroxide (manufactured by FUJIFILM Wako Pure Chemical Corporation, Product Number: 192-02175) was added to commercially available 1-butyl-3-methylimidazolium chloride (manufactured by Sigma-Aldrich, Product Number: 94128) to obtain an ionic liquid (a solvent) in which a concentration of the MIC was 12 ppm.

The ionic liquid obtained was analyzed by ion chromatography. It was confirmed that any anion other than a chloride anion was not contained, and that a cation except for 1-butyl-3-methylimidazolium chloride, 1-butyl-3 methylimidazolium derived from sodium hydroxide, and sodium, was only 1-methylimidazolium cation. A concentration of the MIC in the ionic liquid obtained was measured by neutralization titration using sodium hydroxide. The unit was in ppm.

<Preparation of Cellulose Solution (Composition)>

To the ionic liquid prepared described above, added was a dissolving pulp (manufactured by Georgia-Pacific Cellulose, Product No.: V-81) and stirred at 100° C., to prepare a cellulose solution (a composition) having a concentration of 9% by mass.

With respect to the cellulose solution obtained, a shear viscosity under the condition of 100° C. and a shear rate of 0.1 ($s^{-1}$) was measured for the solution immediately after the preparation and for the solution after keeping at 100° C. for 5 hours (after a heat treatment), respectively. The unit was in Pa·s. Further, a shear viscosity retention ratio times 100 (unit: %) of the cellulose solution after keeping at 100° C. for 5 hours to the cellulose solution immediately after the preparation, that is, (the shear viscosity of the composition after the heat treatment)/(the shear viscosity of the composition immediately after the preparation) times 100 (unit: %) was calculated. It is meant that the lower the shear viscosity change, the less decomposition of the cellulose. The results are shown in Table 1.

The shear viscosity was measured by using a rotary rheometer under the condition of 100° C. and a shear rate of 0.1 ($s^{-1}$).

The rotary rheometer used here was Kinexus Pro+, manufactured by Malvern Panalytical Ltd.

<Production of Cellulose Fiber>

With respect to the cellulose solutions (immediately after preparation and after keeping at 100° C. for 5 hours) prepared described above, each solution was charged in a syringe as shown in FIG. 1 and discharged from a nozzle having a nozzle diameter of 0.27 mm, to wind a cellulose fiber coagulated in water by a winding machine. At this time, the cellulose fiber was wound at a speed of 50 times of the discharge speed, to be stretched in the fiber longitudinal direction. A number average fiber diameter of the cellulose fiber obtained was 10 μm. The number average fiber diameter was an average value measured at 20 sectional places perpendicular to the fiber length of the cellulose fiber.

With respect to the cellulose fiber obtained, tensile strength was measured in accordance with the provisions of JIS L 1013.

The tensile testing machine used here was EZ-SX manufactured by Shimadzu Corporation.

The unit of the tensile strength was in MPa.

Examples 2 to 5, Comparative Examples 1 and 2

<Preparation of Ionic Liquid (Solvent)>

Sodium hydroxide was added to commercially available 1-butyl-3-methylimidazolium chloride, to obtain an ionic liquid in which a concentration of the MIC was 12 ppm. The MIC was added to this ionic liquid to be adjusted to the concentration of 1-methylimidazolium chloride (the concentration of the MIC) shown in Table 1, thereby obtaining intended ionic liquid.

<Preparation of Cellulose Solution (Composition)>

The ionic liquid used in Example 1 was changed to the ionic liquid obtained above, but others were conducted in the same manner as Example 1.

<Production of Cellulose Fiber>

In Examples 4 and 5 and Comparative Example 1, the cellulose solution prepared above was kept at 100° C. for 5 hours, to obtain the cellulose fiber in the same manner as Example 1.

Comparative Example 3

<Preparation of Ionic Liquid (Solution)>

As an ionic liquid, commercially available 1-butyl-3-methylimidazolium chloride was used as it was.

<Preparation of Cellulose Solution (Composition)>

The ionic liquid used for Example 1 was changed to the above ionic liquid, but others were conducted in the same manner as Example 1.

Example 6

<Preparation of Ionic Liquid (Solution)>

A weakly basic ion exchange resin (available from Organo Corporation, product name: Amberlite® IRA-67) was added to a commercially available 1-butyl-3-methylimidazolium chloride (manufactured by Sigma-Aldrich, product No.: 94128) and after stirring and filtering, to obtain an ionic liquid (a solvent) in which a concentration of the MIC is 10 ppm or less. A concentration of the MIC in the ionic liquid obtained was measured in the same manner as Example 1.

<Preparation of Cellulose Solution (Composition)>

The ionic liquid used for Example 1 was changed to the ionic liquid obtained above, but others were conducted in the same manner as Example 1.

TABLE 1

| | | Shear viscosity of cellulose solution | | | Tensile strength | |
|---|---|---|---|---|---|---|
| | MIC concentration | Immediately after preparation | After 5 hours | Retention ratio | Immediately after preparation | After 5 hours |
| Example 1 | 12 | 3460 | 3120 | 90% | 1010 | 995 |
| Example 2 | 20 | 3370 | 2800 | 80% | — | — |
| Example 3 | 30 | 4010 | 2790 | 70% | — | — |
| Example 4 | 100 | 3600 | 2390 | 66% | — | 973 |
| Example 5 | 240 | 3860 | 2320 | 60% | — | 903 |
| Comparative Example 1 | 330 | 4010 | 1060 | 26% | — | 705 |
| Comparative Example 2 | 460 | 2720 | 140 | 5% | — | — |

TABLE 1-continued

| | MIC concentration | Shear viscosity of cellulose solution | | | Tensile strength | |
| | | Immediately after preparation | After 5 hours | Retention ratio | Immediately after preparation | After 5 hours |
|---|---|---|---|---|---|---|
| Comparative Example 3 | 460 | 2600 | 190 | 7% | — | — |
| Example 6 | <10 | 2860 | 2720 | 95% | — | — |

The MIC concentration in Table 1 indicates a concentration of the MIC (the unit: ppm) with respect to the 1-butyl-3-methylimidazolium chloride.

The unit of the shear viscosity in Table 1 is in Pa·s.

The retention ratio in Table 1 indicates the shear viscosity retention ratio: (the shear viscosity of the composition after the heat treatment)/(the shear viscosity of the composition immediately after the preparation) times 100 (unit: %).

The unit of the tensile strength in Table 1 is in MPa.

In the composition of the present invention, the decomposition of the cellulose of the cellulose solution (composition) was effectively suppressed, even if heated. Further, the cellulose fiber having high tensile strength was obtained.

REFERENCE SIGNS LIST 1 composition (cellulose solution)
2 nozzle
3 cellulose fiber
4 coagulating liquid
5 winding machine

The invention claimed is:

1. A composition comprising cellulose and a compound represented by the following formula (1),
a concentration of 1-methylimidazolium chloride being 300 ppm or less on a mass basis with respect to the compound represented by the formula (1):

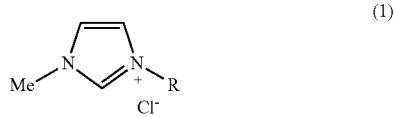

(1)

wherein R is an alkyl group having 2 to 6 carbon atoms, and Me is a methyl group, in the formula (1).

2. The composition according to claim 1, wherein a content of the compound represented by the formula (1) in the composition accounts for 90% by mass or more of a solvent contained in the composition.

3. The composition according to claim 1, wherein the content of 1-methylimidazolium chloride in the composition is 1 ppb or more with respect to the compound represented by the formula (1).

4. The composition according to claim 1, wherein R is a butyl group in the formula (1).

5. A method for producing a cellulose fiber, comprising spinning a composition,
the composition comprising cellulose and a compound represented by the following formula (1),
a concentration of 1-methylimidazolium chloride being 300 ppm or less on a mass basis with respect to the compound represented by the formula (1):

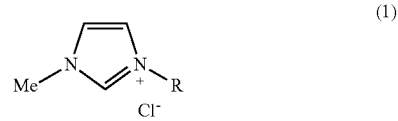

(1)

wherein R is an alkyl group having 2 to 6 carbon atoms, and Me is a methyl group.

6. The method for producing the cellulose fiber according to claim 5, wherein a content of the compound represented by the formula (1) in the composition accounts for 90% by mass or more of a solvent contained in the composition.

7. The method for producing the cellulose fiber according to claim 5, wherein a content of 1-methylimidazolium chloride in the composition is 1 ppb or more with respect to the compound represented by the formula (1).

8. The method for producing the cellulose fiber according to claim 5, wherein R is a butyl group in the formula (1).

9. The method for producing the cellulose fiber according to claim 5, wherein the compound represented by the formula (1) is obtained by treating a reaction product of 1-methyl imidazole and RCl with a treating agent having ion adsorption ability, and wherein R is an alkyl group having 2 to 6 carbon atoms.

10. The method for producing the cellulose fiber according to claim 9, wherein the treating agent having ion adsorption ability is at least one selected from the group consisting of an ion exchange resin, activated carbon, zeolite, hydrotalcite, and a metal oxide.

11. The method for producing the cellulose fiber according to claim 5, wherein the compound represented by the formula (1) is obtained by treating a reaction product of 1-methyl imidazole and RCl with an alkali, and wherein R is an alkyl group having 2 to 6 carbon atoms.

12. The method for producing the cellulose fiber according to claim 11, wherein the alkali is at least one selected from the group consisting of sodium hydroxide, potassium hydroxide, lithium hydroxide, calcium hydroxide, magnesium hydroxide, strontium hydroxide, barium hydroxide, tetramethylammonium hydroxide, tetraethylammonium hydroxide, and tetrabutylammonium hydroxide.

13. The method for producing the cellulose fiber according to claim 5, wherein the method comprises immersing the spun cellulose fiber in a coagulating liquid, to elute the compound represented by the formula (1) contained in the cellulose fiber into the coagulating liquid.

14. The method for producing the cellulose fiber according to claim 13, wherein the method comprises recycling the compound represented by the formula (1) eluted into the coagulating liquid.

15. The method for producing the cellulose fiber according to claim 13, wherein the coagulating liquid comprises water.

16. The method for producing the cellulose fiber according to claim 6, wherein a content of 1-methylimidazolium chloride in the composition is 1 ppb or more with respect to the compound represented by the formula (1).

17. The method for producing the cellulose fiber according to claim 6, wherein R is a butyl group in the formula (1).

18. The method for producing the cellulose fiber according to claim 6, wherein the compound represented by the formula (1) is obtained by treating a reaction product of 1-methyl imidazole and RCl with a treating agent having ion adsorption ability, and wherein R is an alkyl group having 2 to 6 carbon atoms.

19. The method for producing the cellulose fiber according to claim 6, wherein the treating agent having ion adsorption ability is at least one selected from the group consisting of an ion exchange resin, activated carbon, zeolite, hydrotalcite, and a metal oxide.

20. The method for producing the cellulose fiber according to claim 6, wherein the compound represented by the formula (1) is obtained by treating a reaction product of 1-methyl imidazole and RCl with an alkali, and wherein R is an alkyl group having 2 to 6 carbon atoms.

* * * * *